F. A. FOX.
TIRE CHAIN.
APPLICATION FILED MAY 11, 1908.
911,585.
Patented Feb. 9, 1909.
3 SHEETS—SHEET 1.
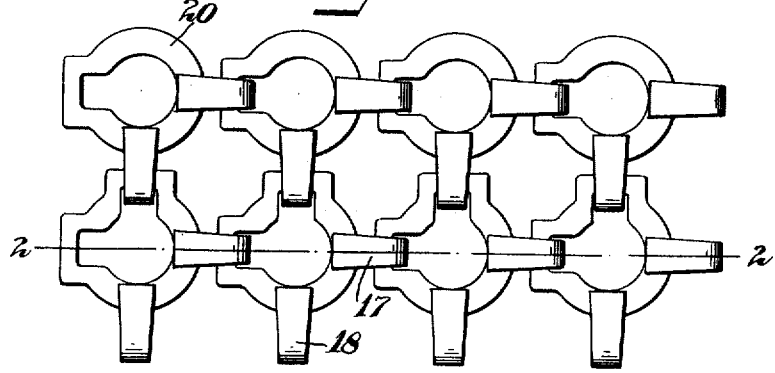
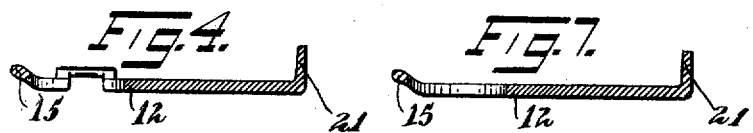
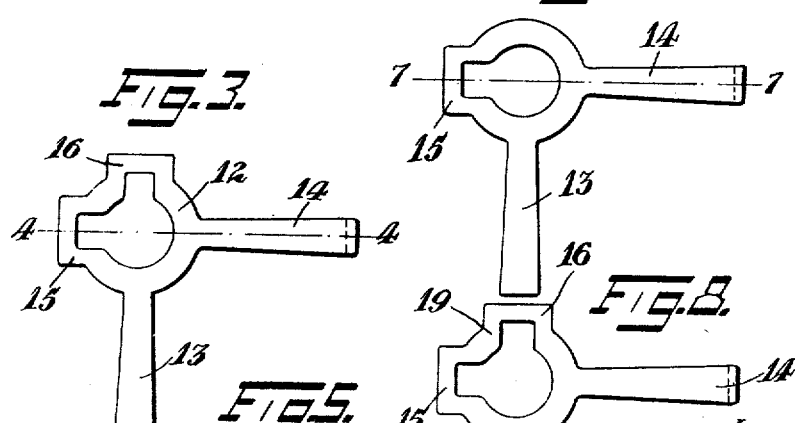
Witnesses:
Inventor:
Frank A. Fox,
By his Attorney,
F. H. Richards.

F. A. FOX.
TIRE CHAIN.
APPLICATION FILED MAY 11, 1908.
911,585.
Patented Feb. 9, 1909.
3 SHEETS—SHEET 2.
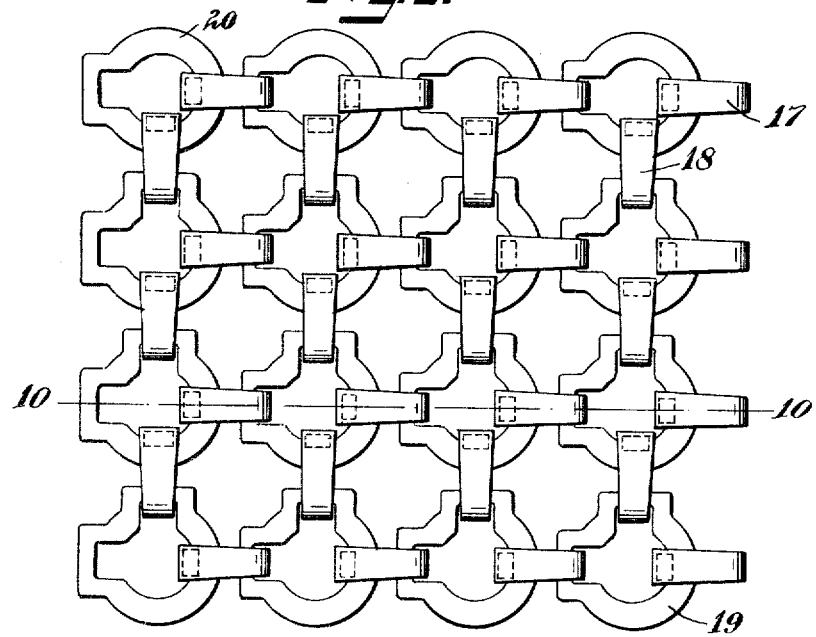
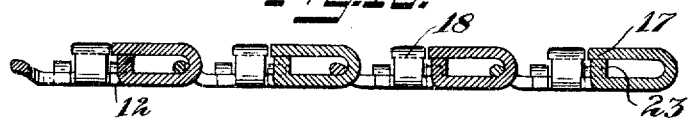
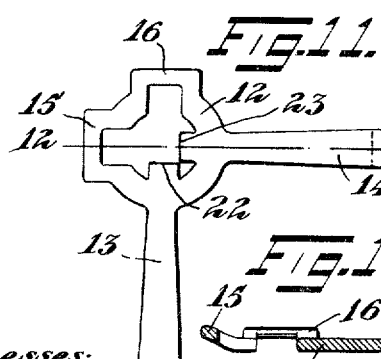
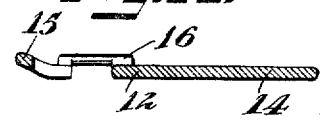
Witnesses:
S. Newman
H. D. Penney
Inventor.
Frank A. Fox,
By his Attorney,
F. H. Richards.

F. A. FOX.
TIRE CHAIN.
APPLICATION FILED MAY 11, 1908.
911,585.
Patented Feb. 9, 1909.
3 SHEETS—SHEET 3.
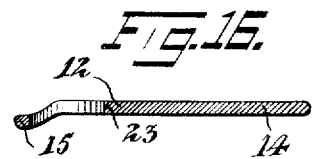
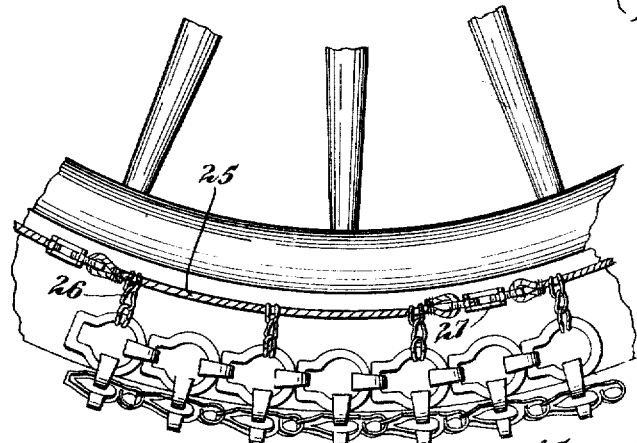
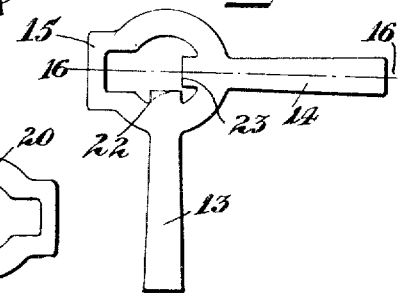
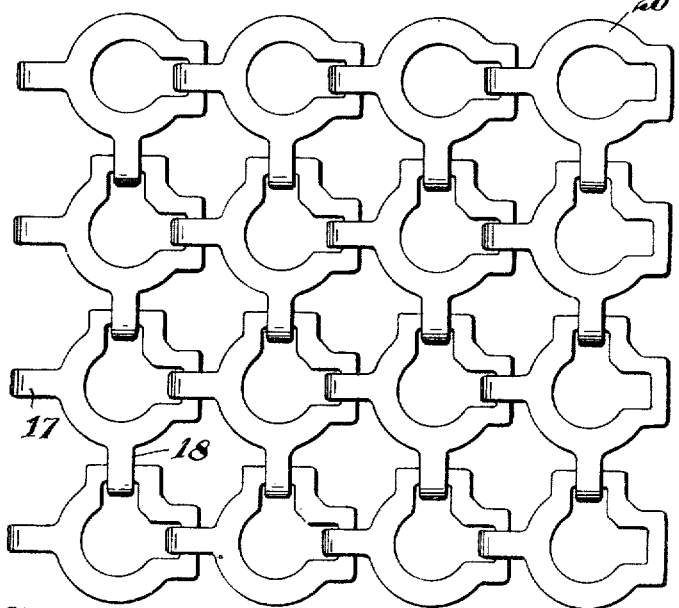
Witnesses:
Inventor:
Frank A. Fox,
By his Attorney,

UNITED STATES PATENT OFFICE.

FRANK A. FOX, OF NEW YORK, N. Y., ASSIGNOR TO FOX METALLIC TIRE BELT COMPANY, OF NEW YORK, N. Y., A CORPORATION OF NEW YORK.

TIRE-CHAIN.

No. 911,585.  Specification of Letters Patent.  Patented Feb. 9, 1909.

Application filed May 11, 1908. Serial No. 432,179.

*To all whom it may concern:*

Be it known that I, FRANK A. FOX, a citizen of the United States, residing in New York city, in the county of New York and State of New York, have invented certain new and useful Improvements in Tire-Chains, of which the following is a specification.

This invention appertains to protectors or armors for tires, especially tires of the pneumatic form; and has for its object to provide an improved form of such device that will effectually prevent slippage of the tire either laterally or longitudinally of the wheel; and which device can be economically and easily constructed; and can be readily attached to and detached from the tire.

In the accompanying drawings, representing embodiments of my invention, Figure 1 is a plan view of a portion of the armor. Fig. 2 is a longitudinal section on the line 2—2 indicated in Fig. 1. Fig. 3 is a plan view of one of the link blanks. Fig. 4 is a section on the line 4—4 indicated in Fig. 3. Fig. 5 is a side elevation of the blank shown in Fig. 8. Fig. 6 is a plan view of one of the marginal link blanks. Fig. 7 is a section on the line 7—7 indicated in Fig. 6. Fig. 8 is a plan of another form of marginal link. Fig. 9 shows a portion of a modified form of armor. Fig. 10 is a section on the line 10—10 indicated in Fig. 9. Fig. 11 is a plan view of one of the links of this modification. Fig. 12 is a section on the line 12—12 indicated in Fig. 11. Fig. 13 indicates in plan one of the marginal hooks of this modification. Fig. 14 is an elevation of the link shown in Fig. 13. Fig. 15 shows another form of marginal link in plan. Fig. 16 is a section on the line 16—16 indicated in Fig. 15. Fig. 17 is a plan view of the under side of the armor; and Fig. 18 shows in side elevation a portion of a wheel and tire with the armor attached thereto.

The armor is shown as composed of a number of links extending in longitudinal and transverse rows and provided with integral hook portions and eye portions connecting the rows both longitudinally and transversely by a kind of hinge joint. Preferably the intermediate links are provided with hook portions on two adjacent sides, and on the two opposite sides are eye portions that are engaged by the hook portions of the respective adjacent longitudinal and transverse links. But with the marginal links, obviously one of the transverse connecting members can be omitted. On one side of the armor, the hook member is omitted, while on the opposite side, the eye member is omitted.

In the construction illustrated in Figs. 1 to 7 inclusive, also in Figs. 17 and 18, the links are shown as comprising a single integral member composed of a substantially annular flat body portion 12 having projecting from two sides tongues 13 and 14, preferably extending at right angles. On the opposite sides of the annular portion are extensions forming eyelets and having transverse portions 15 and 16 for engagement with the hook portions of the two adjacent links. The tongue portions 13 and 14 are bent upon themselves as indicated in Figs. 1 and 2, to form hooks 17 and 18 which hooks engage the eye portions 15 and 16 of the respective adjacent links, as shown. But the marginal links on one side have the tongue 13 omitted, as shown by the links 19 in Figs. 9 and 8. On the opposite side of the chain, the links 20 have the eye portion 16 omitted. The hook portions are not closed down tight over the eye portions but provide a loose joint in the nature of a hinge joint, whereby the armor will conform to the convex surface of the tire.

To insure the hook portion against being mashed down by the weight of the vehicle thereon, a lug portion is provided at the free end of the hook, that will serve to form a closed eye. In the construction shown in Figs. 2—8, the lug portion is formed by bending the end of the hook members 13 and 14 at 21 as indicated in Figs. 2, 4 and 7. This is preferably done before the hook member is bent upon itself as shown in Fig. 4. The extremity of the hook member will engage the body portion 12 of the link and act as a lug to take the strain upon the hook member and prevent its closing down upon itself.

The eye portions 15 and 16 are preferably bent upward at their transverse portion as shown in Fig. 2 so that the transverse portion engaged in the hook will lie above the plane of the body portion of the links, and thereby the lower face of the links will lie substantially in the same plane.

In Figs. 9—15, is shown a modification in which the lug for supporting the end of the hook is formed by providing extensions 22 and 23 on the narrow part of the body portion 12 of the link which extensions are bent upwardly as indicated in Fig. 10 to engage the extremity of the hook portion when bent over.

The hook portions are preferably first bent over but not closed down on the link leaving sufficient space to thread the eye portion of the adjacent link on the hook. These are assembled in this manner in longitudinal rows and also connected in transverse rows to provide a sufficient width to the chain; four rows having been found a practicable number, but a greater or less number can be used if desired. The marginal links on one side have the second hook member omitted, while the marginal links on the other side have the second eye member omitted as has been set forth. Preferably the chain is formed of sufficient length to encircle the tire and the two ends are permanently connected together. All of the links are preferably formed with a small amount of play in the plane of the link, so that the armor can be placed over the tire in its normal inflated condition, and then the sides are pressed down to engage the curved tread of the tire, the play in the link permitting the side links to approach each other slightly on account of the reduced diameter at this part of the tire. Any suitable or desired means can be employed for securing the armor to the tire, preferably by means engaging the marginal links that are shown as rounded on their outer portion. In Fig. 18 the armor is shown as connected with a cable 25 by short chains 26 at suitable intervals such as each alternate side link. The cable 25 may be adjustably secured by means of turnbuckles 27.

It will be observed from Figs. 10 and 2 that the armor has a comparatively flat surface on its lower side where it engages the tread of the tire, and the links being flat instead of rounded, will not tend to unduly compress the tire or be forced into it. On its tread surface the armor will be seen to be provided with a number of lug portions formed by the upper bent over portion of the hooks 17, that project beyond the body portion 12 of each link. These will serve to engage the road by considerable friction and prevent slippage of the wheels. As the hooks extend both longitudinally and transversely, they would prevent slippage in both directions, the side edges of the hooks effectually preventing the skidding of the wheels.

It will be seen that armor of this character can be very economically and readily constructed, as the links are practically identical except that the outer links have a less number of hooks or eyes, and that the three forms can be stamped out of sheet metal, and then the tongues and eye portions readily bend up to the proper shape for engagement with the adjacent ones. And after assembled it is only necessary to force the hook portions down to their proper positions when the armor is complete; and this is facilitated by the fact that it is formed in a flat condition and a single piece to be afterward joined at the ends by simply engaging the four hooks at one end with the four eyes at the other and then closing these hooks. The armor when detached will lie comparatively flat and can be readily carried for future use. And when desired can be very easily attached to the tire. While having a comparatively flat under surface engaging the tire yet the open portions of the link will have sufficient frictional engagement with the tire to prevent slippage of the armor with the tire and will not be entirely dependent on the fastening means of the armor to the tire.

Having thus described my invention, I claim:

1. Anti-skid attachment for tires, comprising links having a substantially flat base and provided with integral eye portions, and integral hook portions engaging the eye portions of adjacent links, the hook portions beyond the joint extending substantially parallel with the base and offset therefrom to form the tread portion of the device, the links having integral portions supporting the hook extensions.

2. Anti-skid device for tires, comprising links having flat bases and provided with integral eye portions and integral hook portions engaging the eye portions in adjacent similar links, the hook portions beyond the joint extending substantially parallel with the base portions of the link, the hooks having an integral lug projecting downward to engage the base and support the hook extensions.

3. Anti-skid device for tires, comprising links having a substantially flat annular base portion extended at two sides to form transversely disposed eyes both bent upward from the base, the links having integral hook portions on the sides opposite the said eye portions respectively that engage the eye portions in adjacent similar links, the hook portions beyond the joints extending substantially parallel with the base, the links having integral portions supporting the said hook portions.

4. Anti-skid device for tires, comprising links having a substantially flat annular base portion extended at two sides to form transversely disposed eyes both bent upward from the base, the links having integral hook portions on the sides opposite the said eye portions respectively that engage corresponding eye portions in adjacent similar links, the hook portions beyond the joints extending substantially parallel with the base, the hook portions having integral portions projecting down to engage the base and supporting the hook portion.

FRANK A. FOX.

Witnesses:
W. A. MALONE,
FRED. J. DOLE.